United States Patent [19]
McCray

[11] 3,760,134
[45] Sept. 18, 1973

[54] CABLE AND SWITCH APPARATUS AND METHOD FOR PREVENTING DAMAGE TO TRAILING CABLE POWER SYSTEM

[75] Inventor: Richard N. McCray, Bluefield, W. Va.

[73] Assignee: Pemco Corporation, Tazewell County, Va.

[22] Filed: Aug. 3, 1972

[21] Appl. No.: 277,508

[52] U.S. Cl...... 200/52 R, 200/61.58 R, 200/61.62, 200/61.67, 200/161, 340/282
[51] Int. Cl. .......................................... H01h 17/12
[58] Field of Search ............... 200/52 R, 61.58 R, 200/61.62, 61.67, 61.72, 61.80, 61.81, 161, 61.19, 169 R; 340/280, 282; 180/2; 191/12 R

[56] References Cited
UNITED STATES PATENTS
| | | | |
|---|---|---|---|
| 2,305,603 | 12/1942 | Cadman | 200/52 R |
| 2,848,571 | 8/1958 | Carroll | 200/161 X |
| 2,722,575 | 11/1955 | Dobkins | 200/61.58 R X |
| 2,554,728 | 5/1951 | Barber | 200/61.8 X |
| 2,141,293 | 12/1938 | Davidson | 200/52 R X |

Primary Examiner—J. R. Scott
Attorney—Thomas B. Van Poole et al.

[57] ABSTRACT

An electric power source is disclosed connected to an electrically driven movable vehicle such as a mining machine by a trailing power cable with a flexible chain connected to the cable at a point on the cable spaced from the cable connection to the power source and with the chain connected on its other end to a switch on the power source for interrupting power to the cable upon tensioning movement of the chain outwardly from the power source. The chain is of less length than the length of the cable between the point at which the chain is connected to the cable and the end of the cable connected to the power source so that the power is interrupted before the cable is tensioned and any damage to the cable or connector is consequently avoided.

23 Claims, 9 Drawing Figures

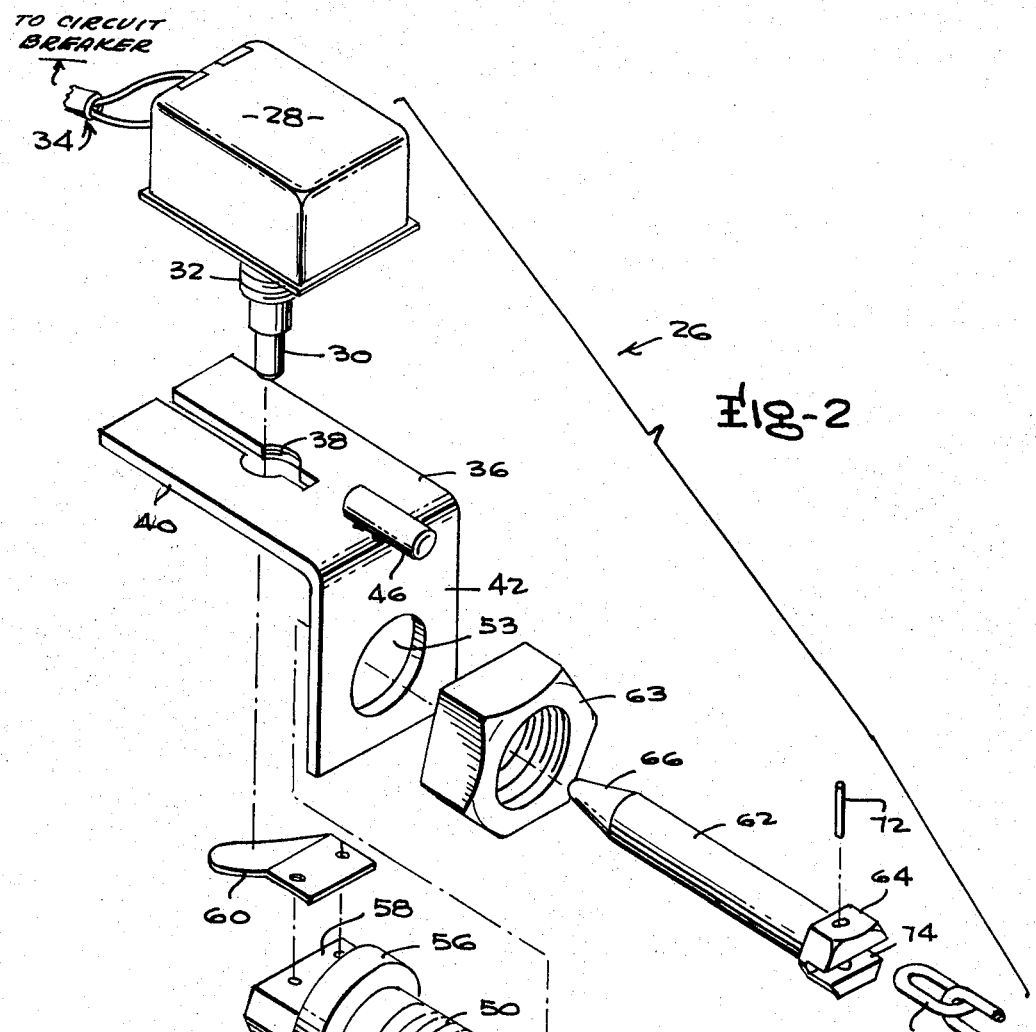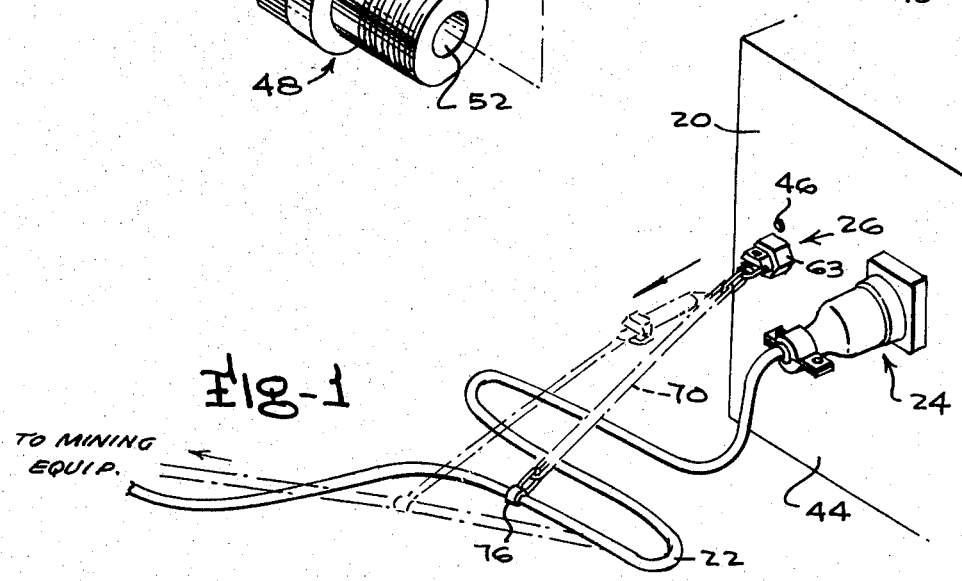

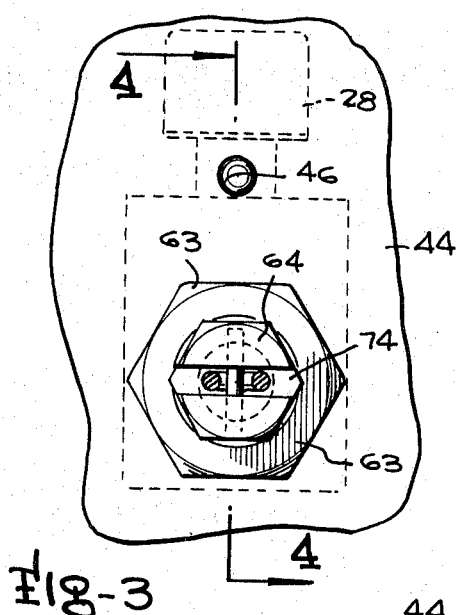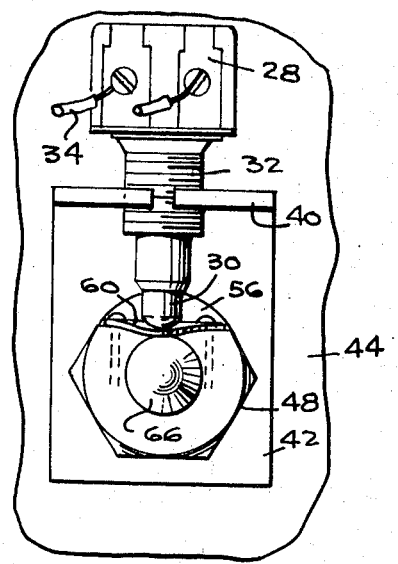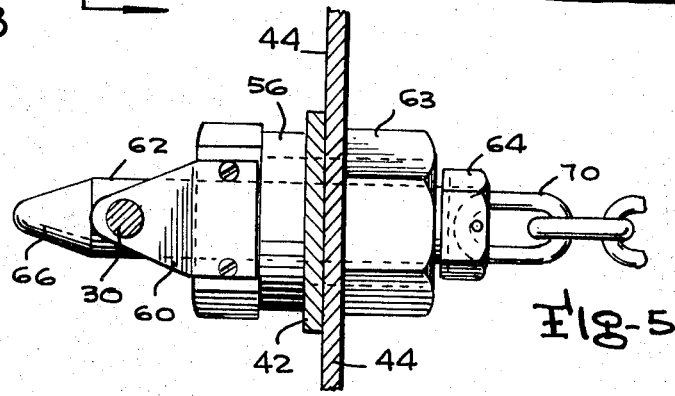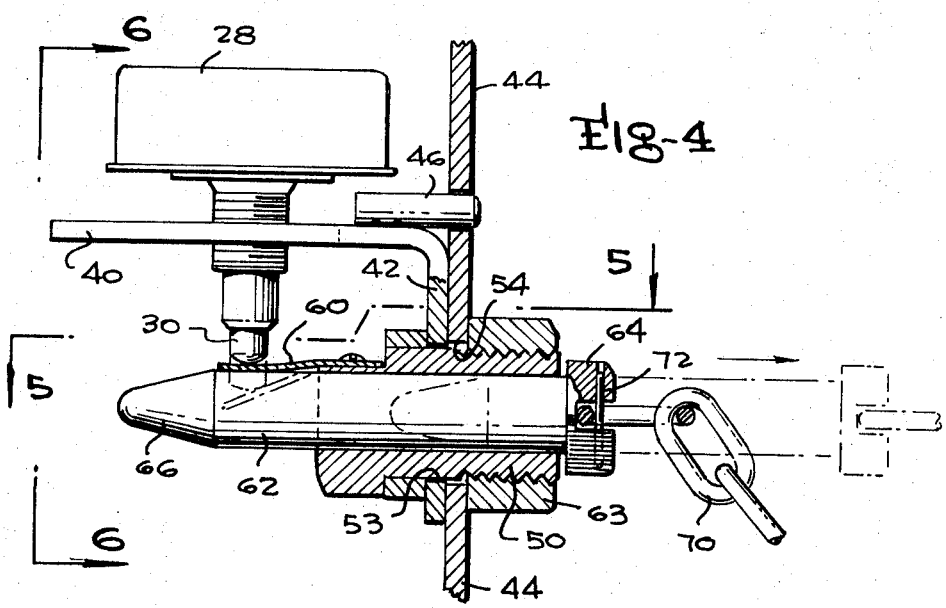

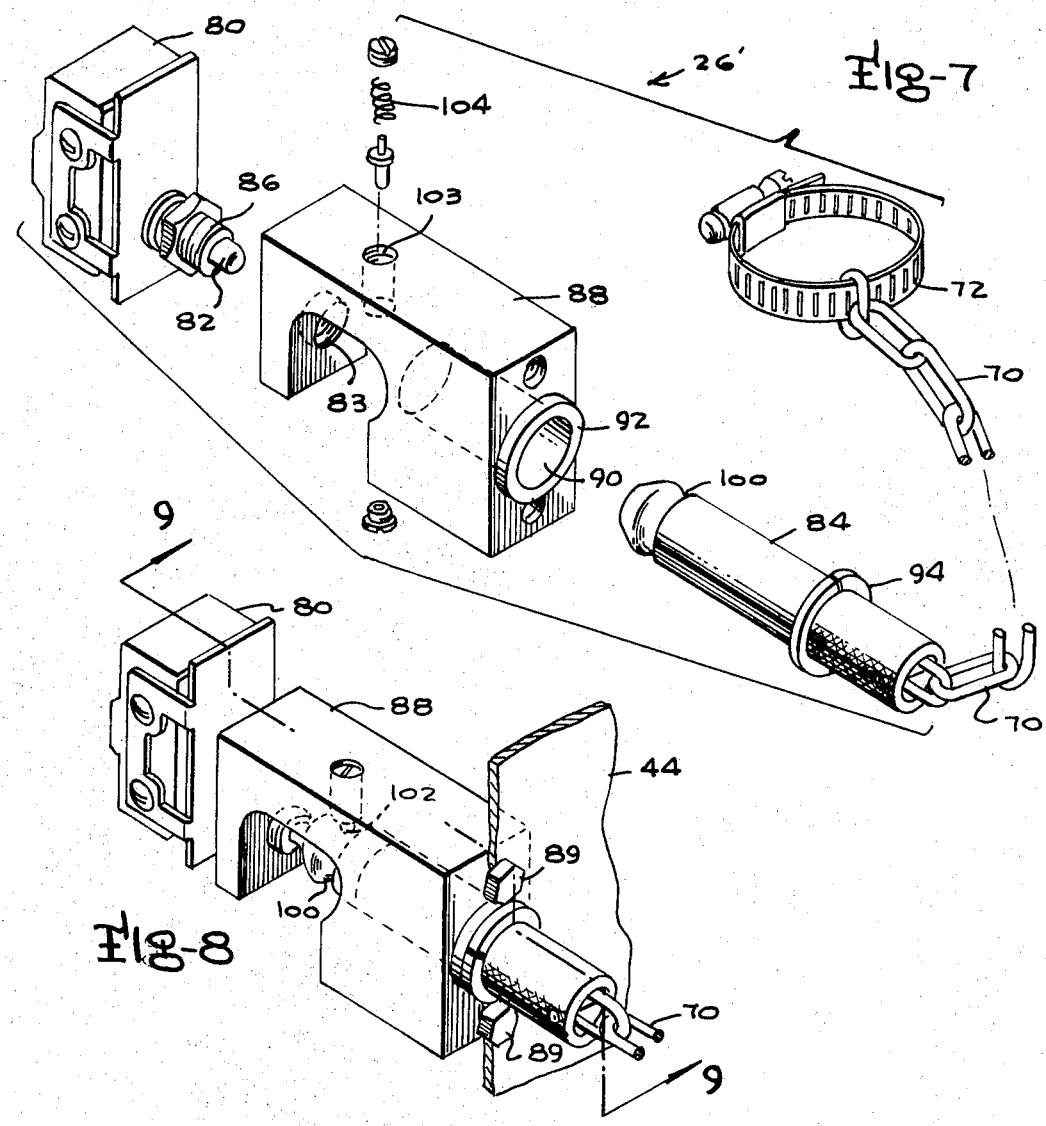
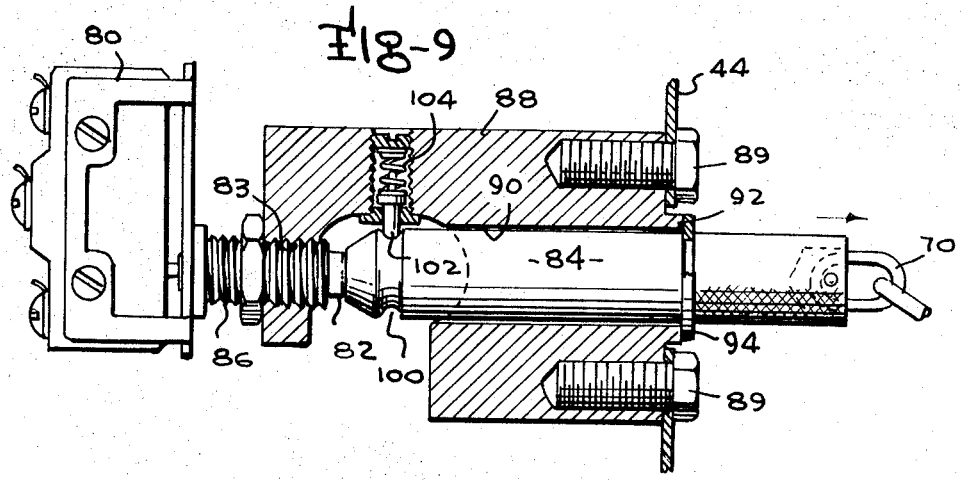

CABLE AND SWITCH APPARATUS AND METHOD FOR PREVENTING DAMAGE TO TRAILING CABLE POWER SYSTEM

This invention is in the field of safety apparatus and methods and is specifically directed to an apparatus and method for preventing accidental damage to trailing cable power conductors connected between a power source and an electrically driven vehicle such as mining equipment or the like.

Mining equipment is normally powered by a trailing power cable which is analagous to an extension cord and which extends rearwardly from the equipment and is connected to a power source for providing the operative power for driving the equipment. It has been found that the operators of mining equipment due no doubt to concentration on the operation of the equipment frequently permit the equipment to move forward a distance away from the power source beyond the full length of the trailing cable. Overtensioning of the cable consequently results and frequently causes the cable to be severed or pulled from the power source to the consequent physical damage to both the cable and the power source.

Moreover, such overtensioning of the cable can result in an electrical arcing to consequently create an extreme fire and explosion hazard of danger to anyone in the mine.

The foregoing problems have been a continuing problem for which the present invention is the first and only practical known solution.

Therefore, it is the primary object of the subject invention to provide an apparatus and method for preventing accidental damage to a cable or power source or the coupling therebetween by over extended movement of the cable away from the power source.

Another object of this invention is to provide an apparatus and method for preventing damage to a power cable, power source or mining apparatus operated by power through the cable from the power source.

Achievement of the objects of this invention are obtained through the provision of a switch in the power source connected to the source of power for disconnecting electrical power to the outlet from the power source which is connected to the trailing power cable. The switch has an actuator engageable with a slip pin which, when inserted in its normal position, maintains the switch in a closed condition. However, the slip pin is connected to one end of a relatively light flexible chain which has its other end connected to a portion of the trailing power cable a given distance spaced along the length of the cable from the connection of the cable to the power source. The length of the cable between the end of the cable connected to the power source and the small section of the cable to which the chain is connected is greater than the length of the chain. Consequently, forward movement of the trailing cable will initially tension the chain to pull the slip pin from its normal position and to consequently result in opening of the safety switch contacts for terminating power to the cable. Therefore, since the power to the cable is terminated, the mining equipment being operated by the cable immediately comes to a halt and no further forward movement can occur to cause any damage to the cable.

A better understanding of the subject invention will be enabled when the following written description is read in conjunction with the appended drawings, in which:

FIG. 1 is a perspective view illustrating the preferred embodiment for practice of the invention;

FIG. 2 is an exploded perspective view of a portion of the preferred embodiment;

FIG. 3 is an elevational view of a portion of the preferred embodiment;

FIG. 4 is a sectional view taken along lines 4—4 of FIG. 3;

FIG. 5 is a sectional view taken along lines 5—5 of FIG. 4;

FIG. 6 is a sectional view taken along lines 6—6 of FIG. 4;

FIG. 7 is an exploded perspective of a second embodiment of the invention;

FIG. 8 is a perspective view of the embodiment of FIG. 7 in assembled condition; and FIG. 9 is a sectional view taken along lines 9—9 of FIG. 8.

Attention is initially invited to FIG. 1 of the drawings which illustrates a power source 20 to which flexible electrical conductor cable 22 is connected. One end of the flexible conductor cable 22 is connected to the power source 20 by means of any conventional electrical coupling 24 with the exact coupling depending upon the power requirements and the nature and construction of the power unit and the cable per se. The other, or downstream, end of the cable 22 is connected to a movable vehicle (not shown), such as mining apparatus or equipment which is powered by means of electrical energy supplied through the cable 22.

A power-disconnect apparatus generally designated 26 is provided for disconnecting power to the cable 22 in a manner to be discussed. The power disconnect apparatus 26 includes a switch member 28 having an outwardly biased switch actuator 30 extending outwardly coaxially from an externally threaded nipple 32. Movement of the switch actuator 30 to its outwardly extended position by means of internal springs (not shown) in the switch 28 results in opening of the switch contacts. Conductors 34 extending from switch 28 can be connected to a circuit breaker as indicated in FIG. 2 so that opening of the switch contacts 28 serves to actuate the circuit breaker and disconnect power to the cable 22. Moreover, the switch 28 can also be connected in series with the cable 22 so as to serve as a direct link in the electrical circuit which can be disconnected by opening of the switch 28. Generally speaking, the last-mentioned type operation would preferably be employed in low power operations while a circuit breaker could be used in operations employing larger amounts of power.

Threaded nipple 32 of the switch 28 is threadably received in an angle bracket plate 36 by means of a threaded aperture 38 in a first leg 40 of the bracket plate as shown in FIG. 2. A second leg 42 is abuttingly positioned against the interior surface of a panel 44 of the power source and a guide pin 46 having its outer end received in a mating opening in panel 44 is welded to the top surface of leg 40 for maintaining the bracket plate in fixed position as best shown in FIG. 4.

Positioning means in the form of a threaded fitting 48 is provided for supporting the bracket plate 36 with the fitting 48 including a threaded tubular portion 50 having an axial smooth surfaces passageway 52 extending along its entire length. Tubular portion 50 extends through an aperture 53 (FIG. 2) in a second leg 42 of the bracket plate 36 and also extends through an aperture 54 in the panel 44. A circular base flange 56 having a greater diameter than the diameter of either aperture 53 or 54 extends outwardly from the fitting 48 with a flat shoulder 58 being provided immediately adjacent the base flange 56 as best shown in FIG. 2. A spring plate member 60 is fixed to the shoulder 58. A threaded nut 63 (FIG. 2) is received on the threads of tubular portion 50 for retaining the entire apparatus in place as best shown in FIGS. 4 and 5.

A slip pin 62 having a head 64 and a tapered forward portion 66 extends through the axial passageway 52 of the fitting 48 as shown in FIG. 4 and consequently serves to deflect the spring plate 60 and the pin 30 engageable with the top thereof upwardly in the position illustrated in FIG. 4. Spring plate 60 isolates switch actuator pin 30 from axial motion of slip pin 62 to protect actuator pin 30 and the switch mechanism from harmful lateral motion.

Switch 28 is consequently in a closed condition when as shown in FIG. 4 and the circuit to the trailing power cable 20 is consequently provided with current for operating the equipment at the end of the cable.

A flexible connector in the form of a chain 70 is connected to the head 64 of slip pin 62 by means of a retaining pin 72 extending through the head and retaining the end link of the chain 70 which extends into a slot 74 in the head 64.

The end of chain 70 opposite the end connected to slip pin 62 is connected by a clamp 76 to cable 22 as shown in FIG. 1. Chain 70 is of less length than is the section of cable 22 extending between the clamp 76 and the coupling 24. Consequently, movement of the trailing cable to the left or away from the power source 20 as shown in FIG. 1 will tension chain 70 before that portion of the cable 22 between clamp 76 and coupling 24 is tensioned. The tensioning of chain 70 will consequently pull pin 62 out of the fitting 48 to consequently permit the switch 28 to be opened. Opening of switch 28 immediately terminates the application of electrical power to cable 22 and consequently terminates any continuing forward movement of the mining equipment being operated by the cable 22. Therefore, it will be seen that the inventive combination prevents any damage to the cable as would be occasioned by further continued movement of the cable 22 forwardly beyond the full length of the cable.

Turning now to FIGS. 7–9, it is to be noted that these figures illustrate a second embodiment of the invention in which the slip pin and switch actuator assembly is of slightly different construction from the construction of the first embodiment but which performs the same functions as the device of the first embodiment. In the second embodiment, the power source is identical to the power source of the first embodiment with the conductor cable being connected to a conventional electrical coupling in a manner identical to that illustrated in FIG. 1. Similarly, the downstream end of the cable is connected to a movable vehicle in the same manner as the first embodiment. The only differences between the first embodiment and the second embodiment reside in the specific switch and slip pin means employed for deactivating current to the power cable upon over extended movement of the cable.

The power-disconnect apparatus of the second embodiment is generally designated 26' and includes a switch member 80 having a switch actuator 82 biassed outwardly in axial alignment with a slip pin 84. The switch actuator 82 is mounted for reciprocation in a threaded nipple 86 which is threadably received in an opening 83 in a mounting block 88. Mounting block 88 is connected to panel member 44 by bolts 89.

Slip pin 84 is slidably received in a bore 90 formed in the mounting block 88 and the mounting block 88 also includes an outwardly extending tubular projection 92 extending outwardly through an aperture in the panel member 44 as clearly shown in FIG. 9. Slip pin 84 includes a radial positioning flange 94 which limits its inward movement and also includes an annular recess 100 near its innermost end. Annular recess 100 is positioned to receive a detent pin 102 mounted in an opening 103 in the mounting block 88 and urged downwardly by means of a spring 104 as shown in FIG. 9.

The opposite end of the slip pin 84 is connected to a chain 70 which is identical to the chain disclosed in the first embodiment and which is connected to the power cable which is not shown in FIGS. 7–9. However, it is again noted that the power cable is identical to the cable that is illustrated in FIG. 1 and the chain connection to the switch 80 of FIGS. 7–9 is identical to the connection described in conjunction with the first embodiment.

In any event, it will be seen that the embodiment of FIGS. 7–9 operates in essentially the same manner as the first embodiment so that outward movement of the chain 70 serves to move the pin 84 out of contact with the switch actuator 82 for deactivating driving power to the vehicle to which the power cable is connected. The main advantage of the embodiment of FIGS. 7–9 over the first embodiment is that the relationship between the slip pin 84 and the switch actuator 82 is such that there is no danger of lateral movement of the switch actuator which might cause damage to the switch 80. Consequently, there is no need to employ protective means such as the spring plate 60 employed in the first embodiment.

It is to be understood that numerous modifications of the subject invention will undoubtedly occur to those of skill in the art and the spirit and scope of the invention is to be limited solely in light of the appended claims.

I claim:

1. In combination, a fixedly positioned electric power source, a flexible electrical conductor connected on one end to said fixedly positioned electric power source for receiving electrical current from said fixedly positioned electrical power source and circuit deactivating means for interrupting the flow of electric current from said electrical power source to said electrical conductor in response to movement of a portion of said electrical conductor a predetermined distance away from said fixedly positioned electric power source while said one end of said flexible electrical conductor remains connected to said fixedly positioned electric power source.

2. The invention of claim 1 wherein said circuit deactivating means comprises a switch means operably connected to one end of a flexible connector means with the other end of said flexible connector means being connected to said flexible electrical conductor at a position along the length of said conductor spaced from said electricl power source.

3. The invention of claim 2 wherein said flexible connector means is of a length less than the length of said flexible electrical conductor between the position at which the flexible connector is connected to the flexible electrical conductor and the end of the flexible electrical conductor connected to said electric power source.

4. The invention of claim 3 wherein said switch means includes a movable switch actuator, a removable slip pin normally positioned in engagement with said switch actuator for holding said switch actuator in a position closing said switch and wherein the end of said flexible connector member opposite the end of said flexible connector member connected to said electrical conductor is connected to said slip pin.

5. The invention of claim 2 wherein said flexible connector is a length of chain.

6. The invention of claim 5 wherein said chain is of a length less than the length of said flexible electrical conductor between the position at which the chain is connected to the flexible electrical conductor and the end of the flexible electrical conductor connected to said electric power source.

7. The invention of claim 6 wherein said switch means includes a movable switch actuator, a positioning means supporting a removable slip pin in engagement with said switch actuator for holding said switch actuator in a position closing said switch and wherein the end of said chain opposite the end connected to said electrical conductor is connected to said slip pin.

8. In combination, an electric power source, an electrically driven movable vehicle, a flexible electrical conductor extending between said electrical power source and said movable vehicle for providing operative power to said vehicle for driving said vehicle, circuit deactivating means responsive to movement of a portion of said flexible electrical conductor beyond a predetermined distance from said power source for interrupting the flow of electric current to said electrical conductor to prevent tensioning and possible damage to the electrical conductor as would be caused by continued further movement of the electrical conductor away from the electric power source.

9. The invention of claim 8 wherein said circuit deactivating means comprises a switch means operably connected to one end of a flexible connector means with the other end of said flexible connector means being connected to said flexible electrical conductor at a position along the length of said conductor spaced from the end of said electrical conductor connected to said electric power source.

10. The invention of claim 9 wherein said flexible connector means is of a length less than the length of said flexible electrical conductor between the position at which the flexible connector is connected to the flexible electrical conductor and the end of the flexible electrical conductor connected to said electric power source.

11. The invention of claim 10 wherein said switch means includes a movable switch actuator, a removable slip pin normally positioned in engagement with said switch actuator for holding said switch actuator in a position closing said switch and wherein the end of said flexible connector member opposite the end of said flexible connector member connected to said electrical conductor is connected to said slip pin.

12. The invention of claim 11 wherein said flexible connector is a length of chain.

13. The invention of claim 12 wherein said switch is mounted upon bracket means positioning said switch actuator against one side of said slip pin when said slip pin is in its normal position and wherein said slip pin is removably mounted in an aperture extending through a fitting means connected to a structural portion of said power source.

14. The invention of claim 13 wherein said fitting additionally includes spring plate means fixed to said fitting and extending between the side of said pin and the end of said switch actuator for preventing lateral movement of the switch actuator by said slip pin such as might damage said switch means.

15. A method of preventing damage to power cables extending from a power source to an electrically driven movable vehicle driven by power supplied by said power cable comprising the steps of sensing movement of a section of said cable spaced a first distance along the length of said cable from the end of the cable connected to said power source and terminating the supply of power from said power source to said cable in response to movement of said section beyond a second given distance spaced from said power source with said second given distance being less than said first given distance.

16. The method of claim 15 wherein said terminating of power from said power source to said cable is effected in response to movement of a switch opening means connected to said section of said cable by a flexible connector means.

17. The invention of claim 4 wherein said movable switch actuator and said removable slip pin are coaxial with said switch actuator engaging the end of said removable slip pin when said removable slip pin is positioned in said position closing said switch.

18. The invention of claim 17 wherein said flexible connector is a length of chain.

19. The invention of claim 18 wherein said chain is of a length less than the length of said flexible electrical conductor between the point at which the chain is connected to the flexible electrical conductor and the end of the flexible electrical conductor connected to said electrical power source.

20. The invention of claim 10 wherein said switch means includes an axially movable switch actuator, a removable slip pin coaxially mounted in alignment with said movable switch actuator and normally positioned in engagement with said switch actuator for holding said switch actuator in a position closing said switch and wherein the end of said flexible connector member opposite the end of said flexible connector member connected to said electrical conductor is connected to said slip pin.

21. The invention of claim 20 wherein said flexible connector member is a length of chain.

22. The invention of claim 20 wherein said switch is mounted upon a mounting block means which includes a bore in which said slip pin is mounted for axial movement.

23. The invention of claim 22 additionally including detent pin means receivable in an annular detent in said slip pin for normally maintaining said slip pin in position engaging said switch actuator for closing said switch.

* * * * *